United States Patent [19]

Tinholt

[11] 4,061,218

[45] Dec. 6, 1977

[54] FLUID COUPLING DEVICE AND BIMETAL COIL FOR USE THEREIN

[75] Inventor: Thomas H. Tinholt, Marshall, Mich.

[73] Assignee: Eaton Corporation, Cleveland, Ohio

[21] Appl. No.: 726,907

[22] Filed: Sept. 27, 1976

[51] Int. Cl.² .................... F16D 35/00; F16D 43/25
[52] U.S. Cl. ................................ 192/58 B; 192/82 T
[58] Field of Search ........................... 192/58 B, 82 T

[56] References Cited

U.S. PATENT DOCUMENTS

| 3,865,221 | 2/1975 | Coty | 192/82 T X |
| 3,899,059 | 8/1975 | Leichliter | 192/58 B X |
| 3,983,981 | 10/1976 | Snodgrass et al. | 192/82 T X |

Primary Examiner—Allan D. Herrmann
Attorney, Agent, or Firm—Teagno & Toddy

[57] ABSTRACT

A fluid coupling device is provided of the type including a rotatable input member and a relatively rotatable output member cooperating with a cover to define a fluid chamber therein. The device includes a movable valve member mounted on a valve shaft which is rotatably supported by a support insert seated within an opening in the cover. The rotational position of the valve shaft is made temperature-responsive by means of a bimetal coil having a first end connected to the valve shaft and a second end mounted relative to the cover. The bimetal coil has a nominal width over the major portion of its length but includes an initial portion adjacent the first end having a width substantially less than the nominal width. The initial portion comprises between about one and one and one-half turns of the coil to permit the coil to be disposed closer to the cover without interfering with the support insert.

12 Claims, 5 Drawing Figures

FLUID COUPLING DEVICE AND BIMETAL COIL FOR USE THEREIN

BACKGROUND OF THE DISCLOSURE

The present invention relates to torque transmitting fluid couplings, and more particularly, to such couplings which utilize temperature-responsive bimetal coils to control the operation of the valving which, in turn, controls the flow of fluid within the coupling, and the torque transmission thereof.

Fluid couplings of the type to which the present invention relates are well known in the art and may be better understood by reference to U.S. Pat. Nos. 3,055,473; 3,174,600; and 3,339,689, assigned to the assignee of the present invention. Briefly, such couplings typically include an output member and a cover which cooperates to define a fluid chamber, a valve plate dividing the fluid chamber into an operating chamber and a reservoir chamber, and an input member disposed within the operating chamber and rotatable relative to the output member. A valving arrangement controls the flow of fluid between the operating and reservoir chambers, typically, in response to ambient air temperature external to the fluid coupling. Therefore, it is common to mount the valve member on a valve shaft which projects outwardly to the cover and has one end of a bimetal coil connected thereto, with the other end of the bimetal coil fixed relative to the cover. Changes in ambient air temperature cause the bimetal coil to unwind or wind tighter, thus rotating the valve shaft.

In the type of fluid coupling described above, it is normally necessary to provide some form of support for the valve shaft, permitting it to rotate relative to the cover. Among the well known and commercially used arrangements for supporting the valve shaft is that shown in U.S. Pat. Nos. 3,263,783 and 3,559,786, wherein a portion of the stamped cover is formed into a cylindrical flange, and, more recently, that shown in copending application Ser. No. 692,106, filed June 3, 1976 (assigned to the assignee of the present invention), wherein a separate cylindrical support insert is seated within a central circular opening in the cover. In either case, the shaft support portion normally projects to extends outwardly beyond the surface of the cover member a substantial distance, e.g., at least about ⅛ to 3/16 of an inch. As may be seen in the cited patents, it has been accepted practice to position the bimetal coil outwardly from the valve support portion (i.e., further away from the cover member), thus defining an area between the bimetal coil and the cover member which is essentially wasted space.

As the trend toward compact and subcompact automobiles has developed, it has become necessary to reduce the size of many of the engine accessory components, especially the axial dimensions thereof. This has also been true in the case of fluid coupling devices to which the present invention relates, and which are typically used in automotive applications as the drive for the radiator cooling fan.

SUMMARY OF THE INVENTION

The objects and advantages of the present invention are accomplished by the provision of a fluid coupling device comprising a first rotatable member, a cover associated with the first member to define a fluid chamber, and a valve means separating the fluid chamber into an operating chamber and a reservoir chamber. A second rotatable member is disposed in the operating chamber and is rotatable relative to the first member. The valve means includes a movable valve member to control the flow of fluid between the operating and reservoir chambers, and includes a valve shaft having an inner end disposed in the reservoir chamber and an outer end extending through the cover, the valve member being associated with the inner end of the valve shaft. The cover includes means supporting the valve shaft for rotation relative to the cover, the support member extending outwardly beyond the cover. A bimetal coil controls the position of the valve shaft and has a first end associated with the outer end of the valve shaft and a second end fixed relative to the cover. The bimetal coil defines a nominal width over a major portion of its length and includes an initial portion adjacent the first end having a width substantially less than the nominal width. The initial portion comprises between about one-half and about two turns of the bimetal coil to prevent interference between the coil and the support means while permitting the coil to be disposed nearer the cover, thus reducing the axial length of the fluid coupling.

BRIEF DESCRIPTION OF THE DRAWINGS

FIG. 2 is an enlarged fragmentary view taken generally on 2—2 of FIG. 1a.

DESCRIPTION OF THE PREFERRED EMBODIMENT

Figure 1:
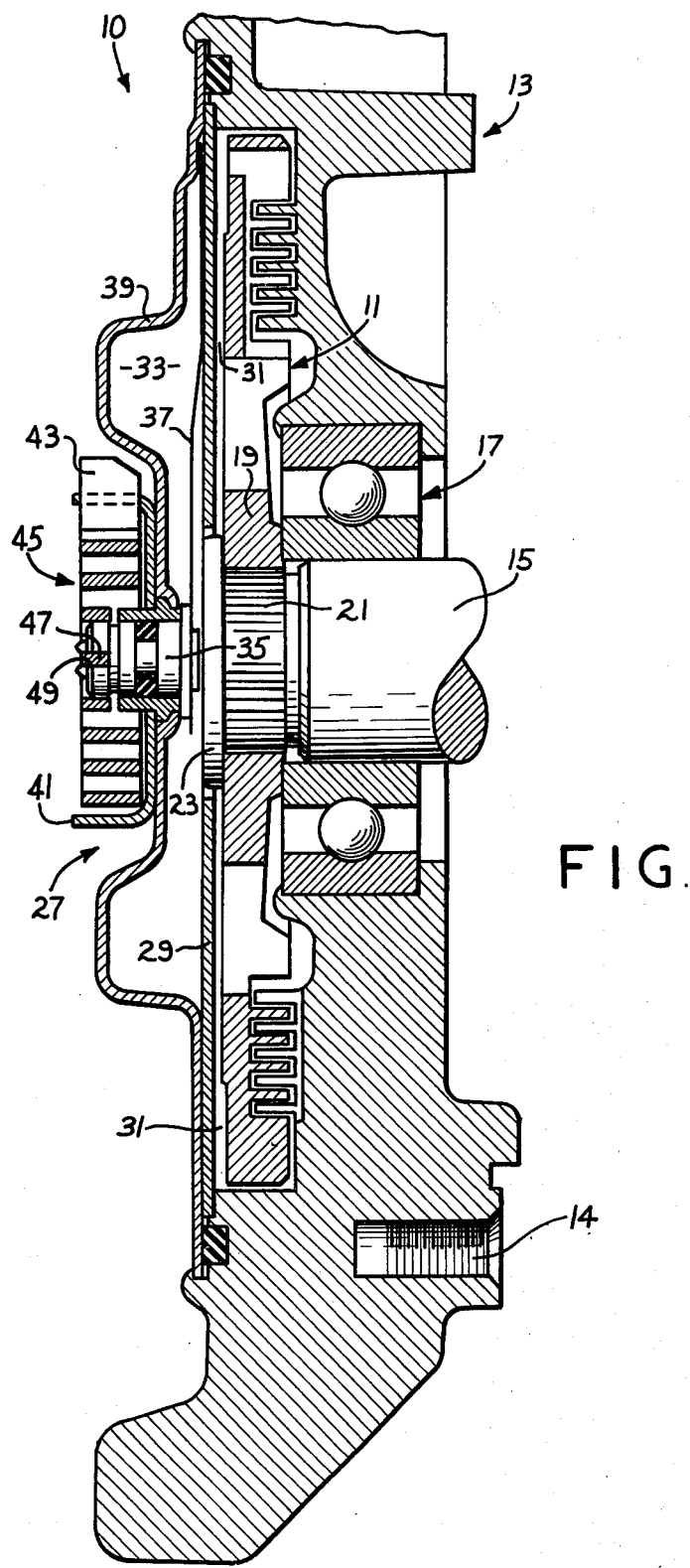
FIG. 1 is an axial cross section of a typical fluid coupling device utilizing the present invention.

Referring now to the drawings, which are not intended to limit the present invention, FIG. 1 illustrates the preferred form of a fluid coupling device generally designated 10, with which the present invention may be utilized. The fluid coupling device 10 includes an input coupling member 11 and an output coupling member 13. Fluid coupling 10 is shown herein as a drive for an automotive engine accessory, and specifically, as a drive for a radiator cooling fan. The fan (not shown) may be bolted to the output coupling member 13 by means of a plurality of threaded bores 14 formed in the member 13. It will be understood, however, that the use of the present invention is not limited to any particular fluid coupling configuration or application.

The fluid coupling 10 includes an input shaft 15 on which input member 11 is mounted and which is rotatably driven, typically by means of a flange (not shown) which may be bolted to the water pump flange (not shown). The input shaft 15 functions as a support for the inner race of a bearing set 17 which is seated on the inside diameter of the output coupling member 13.

The input coupling member 11 is in the form of a disc having a hub portion 19 supported by the forward end of the shaft 15. The hub portion 19 has an opening therethrough which has an interference fit with a serrated portion 21 of the shaft 15. The hub portion 19 is pressed onto the serrated portion 21 until it abuts the side of the inner race of the bearing set 17, and the output end (left end in FIG. 1) of the shaft 15 has a retaining portion 23 to positively retain the input coupling member 11 on the shaft 15, such that rotation of the shaft 15 causes rotation of the input coupling member 11.

The output coupling member 13 cooperates with a cover assembly, generally designated 27, to define a fluid chamber therebetween, the fluid chamber being separated by a valve plate 29 into a fluid operating chamber 31 and a fluid reservoir chamber 33. Rotatably supported by the cover assembly 27 is a valve shaft 35 having attached to its inner end (right end in FIG. 1), a valve arm 37, the general construction and operation of which may be better understood by reference to the above-mentioned U.S. Pat. No. 3,055,473. The cover assembly 27 includes a cover member 39 which, in the subject embodiment, is a single piece metal stamping. Attached, as by welding, to the outer surface of the cover member 39 is a bracket member 41 which supports an outer end 43 of a bimetal coil, generally designated 45, with an inner end 47 of the bimetal coil 45 positioned in a slot 49 formed in the outer end of the valve shaft 35. It should be understood that the scope of the present invention is not limited to any particular configuration of input and output coupling members, or any particular arrangement or functional relationship of the valve plate and valve arm, but it will be apparent to those skilled in the art that the fluid coupling device 10 is constructed and arranged to be as compact axially as is possible.

Figure 1A:
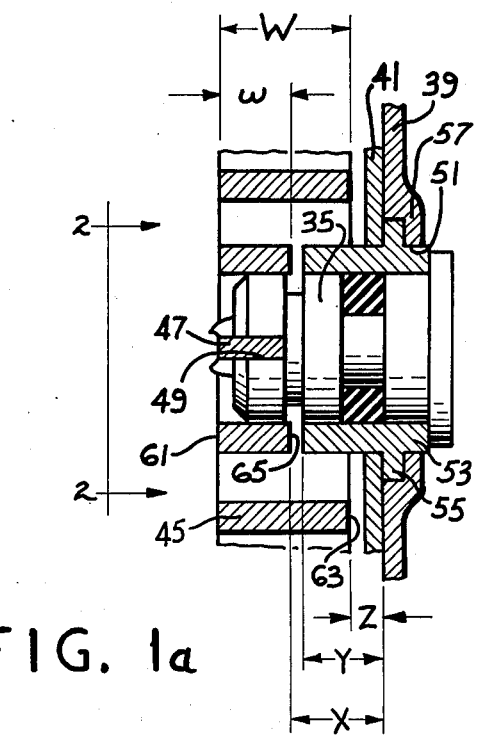
FIG. 1a is an enlarged fragmentary view, similar to FIG. 1 illustrating the invention in greater detail.

Referring now to the enlarged, fragmentary view of FIG. 1a, it may be seen that the cover member 39 defines a central aperture 51, within which is disposed an insert support member 53, the function of which is to rotatably support the valve shaft 35 relative to the cover member 39. The insert support member 53 includes an annular shoulder portion 55 which is trapped between the bracket member 41 and a dished portion 57 of the cover member 39, thereby firmly holding the insert support 53 relative to the cover member 39.

It should be noted that in order to provide adequate support area for the valve shaft 35, the insert support 53 extends outwardly (to the left in FIG. 1) a substantial distance beyond the cover member 39. It will be apparent that, without utilizing the present invention, it would be necessary to position the bimetal coil 45 such that the inner edge (right edge in FIG. 1) is disposed from the cover member 39 by a distance at least slightly greater than the distance which the insert support 53 extends beyond the cover member 39. However, utilizing the teachings of the present invention makes it possible to position the bimetal coil 45 immediately adjacent the bracket member 41 as shown in FIG. 1.

Figure 2:
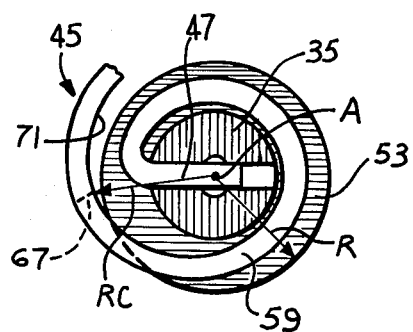
Figure 3:
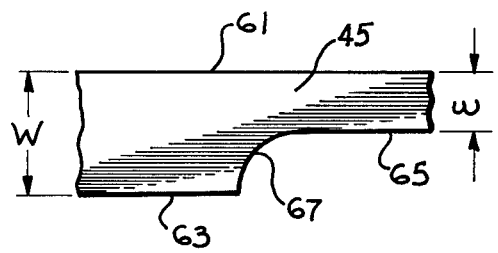
FIG. 3 is a fragmentary elevation of a portion of the bimetal coil shown in FIG. 2, and on the same scale.

Referring now to FIGS. 2 and 3, in conjunction with FIG. 1a, it may be seen that the bimetal coil 45 has a nominal width W over a major portion of its length, but has a substantially narrower width w along an initial portion 59 of the bimetal coil 45. The bimetal coil 45 has an outer edge surface 61 which, in the subject embodiment, defines a straight line over the entire length of the coil and also includes an inner edge surface, i.e., the edge surface disposed adjacent the bracket member 41. The inner edge surface includes a major edge portion 63, and initial edge portion 65 and a transition edge portion 67.

Referring now primarily to FIG. 2, the valve shaft 35 defines an axis of rotation A which, preferably, is coincidental with the axis of rotation of the entire fluid coupling device 10. The outer surface of the support insert 53 defines a radius R about the axis of rotation A, and the inner surface 71 of the bimetal coil 45 defines a progressively increasing radius of curvature RC about the axis of rotation A. It is an essential feature of the present invention that the transition edge portion 67 is disposed at a location along the length of the coil 45 at which the inner surface 71 of the coil 45 has a radius RC which is at least slightly greater than the radius R of the support insert 53, in order that the major portion of the coil 45 (i.e., that portion of the coil having the nominal width W) does not interfere with the support insert 53. Depending upon the actual radius of the support insert 53 relative to the tightness with which the bimetal coil 45 is wound, the narrower initial portion 59 of the coil may comprise from about one-half to about two turns of the coil, and in the subject embodiment, the initial portion 59 comprises between about one turn and about one and one-half turns. In utilizing the present invention, it is preferred that the relatively narrower initial portion 59 extends along the length of the bimetal coil 45 only as far as is necessary to permit the relatively wider major portion of the coil to clear the support insert 53, with a reasonable tolerance provided to take into account any possible errors in the positioning of the coil 45 relative to the valve shaft 35, as well as the flexing of the coil with changes in temperature.

Referring now to FIG. 1a, it may be seen that the support insert 53 extends a distance Y beyond the surface of the cover member 39, while the initial edge portion 65 of the coil inner surface is disposed a distance X from the cover member 39, the distance X being equal to or slightly greater than the distance Y. It may also be seen that the major edge portion 63 is disposed from the cover member 39 a distance Z which is substantially less than the distance X, the difference between the distances X and Z representing the approximate reduction in axial length of the fluid coupling 10 which is made possible by the present invention.

Figure 4:
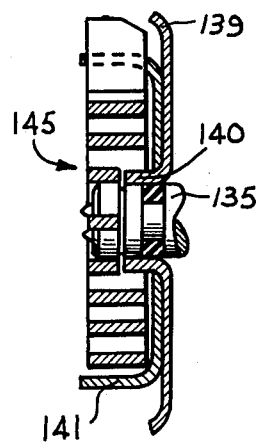
FIG. 4 is a fragmentary cross section, similar to FIG. 1, illustrating an alternative embodiment of the invention.

Referring now to FIG. 4, there is shown an alternative embodiment of the invention in which like elements bear like numerals, plus 100. The primary difference between the embodiment of FIG. 4 and that of FIG. 1 relates to the method of supporting the valve shaft 135, and the bimetal coil 145 may be substantially identical to the bimetal coil 45 as previously described. In FIG. 4, the cover member 139 preferably comprises a metal stamping and includes an integrally-formed, cylindrical support portion 140, rather than the separate support insert 53 of the preferred embodiment. It will be appreciated that each embodiment has certain advantages, the embodiment of FIG. 4 generally being less expensive to manufacture, while the embodiment of FIG. 1 generally provides more rigid and more reliable support for the value shaft. In either case, the appreciable need for the present invention is the same, and the dimensional relationships described in connection with the embodiment of FIG. 1 are equally applicable to the embodiment of FIG. 4.

I claim:

1. A fluid coupling device comprising:
   a. a first rotatable member;
   b. cover means associated with said first member to define a fluid chamber therebetween;
   c. valve means disposed to separate said fluid chamber into a fluid operating chamber and a fluid reservoir chamber;
   d. a second rotatable member disposed in said fluid operating chamber and being rotatable relative to said first member;

e. said valve means including a movable valve member operable to control the flow of fluid between said operating chamber and said reservoir chamber, and further including a valve shaft having an inner end disposed within said fluid chamber and an outer end extending through said cover means, said movable valve member being operable associated with said inner end;

f. said cover means including a cover member and means supporting said valve shaft for rotation relative to said cover member, said support means extending outwardly beyond said cover member;

g. a bimetal coil operable to control the position of said valve shaft, said bimetal coil having a first end portion operatively associated with said outer end of said valve shaft and a second end portion fixedly mounted relative to said cover means; and h. said bimetal coil defining a nominal width over a major portion of its length and including an initial portion adjacent said first end portion having a width substantially less than said nominal width, said initial portion comprising between about one-half and about two turns of said bimetal coil to prevent interference between said coil and said support means and to permit said coil to be disposed nearer said cover member.

2. A fluid coupling device as claimed in claim 1 wherein said width of said initial portion is approximately one-half of said nominal width.

3. A fluid coupling device as claimed in claim 1 wherein said bimetal coil defines an outer edge surface and an inner edge surface, said outer edge surface being generally straight over substantially the entire length of said coil.

4. A fluid coupling device as claimed in claim 3 wherein said inner edge surface includes a generally straight initial edge portion, a generally straight major edge portion, and a transition edge portion extending between said initial and major edge portions.

5. A fluid coupling device as claimed in claim 3 wherein said inner edge surface includes a generally straight initial edge portion disposed a distance X from said cover member and said support means extending a distance Y from said cover member, said distance X being slightly greater than said distance Y.

6. A fluid coupling device as claimed in claim 5 wherein said inner edge surface includes a generally straight major edge portion disposed a distance Z from said cover member, said distance Z being substantially less than said distance X.

7. A fluid coupling device as claimed in claim 1 wherein said support means comprises a generally cylindrical support insert, said cover member defines an aperture and said support insert is fixedly held within said aperture.

8. A fluid coupling device as claimed in claim 1 wherein said cover member comprises a metal stamping and said support means comprises a generally cylindrical support portion formed integrally with said cover member and extending outwardly therefrom.

9. A fluid coupling device as claimed in claim 1 wherein said initial portion of said coil comprises between about one and one and one-half turns of said coil.

10. A fluid coupling device comprising:

a. a first rotatable member defining an axis of rotation and a fluid chamber;

b. a second rotatable member disposed in said fluid chamber and being rotatable relative to said first member;

c. cover means associated with said first member for rotation therewith;

d. means separating said fluid chamber into a fluid operating chamber and a fluid reservoir chamber;

e. valve means including a movable valve member operable to control the flow of fluid between said operating chamber and said reservoir chamber, and further including a valve shaft having an inner end disposed within said fluid chamber and an outer end extending outwardly from said cover means, said movable valve member being operatively associated with said inner end of said valve shaft;

f. said cover means including a cover member and a generally cylindrical support insert having its axis coincident with said axis of rotation, said support insert having said valve shaft rotatably disposed therein, said support insert projecting outwardly beyond said cover member and having a radius R;

g. a bimetal coil operable to control the rotational position of said valve shaft, said bimetal coil having a first end portion connected to said outer end of said valve shaft, and a second end portion mounted relative to said cover means; and h. said bimetal coil defining a nominal width over a major portion of its length and including an initial portion, adjacent said first end portion, having a width substantially less than said nominal width, said bimetal coil defining a progressively increasing radius about said axis of rotation, and said initial portion of said coil extending along said coil to a point at which said coil defines a radius RC, said radius RC being slightly greater than the radius R of said support insert, to permit said major portion of said coil to be disposed closely spaced from said cover member.

11. A fluid coupling device as claimed in claim 10 wherein said bimetal coil defines an inner edge surface including a generally straight initial edge portion disposed a distance X from said cover member, said support insert extending a distance Y from said cover member, said distance X being slightly greater than said distance Y.

12. A fluid coupling device as claimed in claim 11 wherein said inner edge surface includes a generally straight major edge portion disposed a distance Z from said cover member, said distance Z being substantially less than said distance X.

* * * * *